United States Patent [19]

Liu

[11] Patent Number: 5,507,028
[45] Date of Patent: Apr. 9, 1996

[54] HISTORY BASED BRANCH PREDICTION ACCESSED VIA A HISTORY BASED EARLIER INSTRUCTION ADDRESS

[75] Inventor: Lishing Liu, Pleasantville, N.Y.

[73] Assignee: International Business Machines Corporation, Armonk, N.Y.

[21] Appl. No.: 370,342

[22] Filed: Jan. 9, 1995

Related U.S. Application Data

[63] Continuation of Ser. No. 860,631, Mar. 30, 1992, abandoned.

[51] Int. Cl.⁶ .................................................. G06F 9/38
[52] U.S. Cl. .................. 395/375; 364/261.3; 364/261.7; 364/262.8; 364/DIG. 1
[58] Field of Search ................................................ 395/375

[56] References Cited

U.S. PATENT DOCUMENTS

| 4,763,245 | 8/1988 | Emma et al. | 395/375 |
| 4,831,517 | 5/1989 | Crouse et al. | 395/375 |
| 4,984,154 | 1/1991 | Hanatani et al. | 395/375 |
| 5,168,557 | 12/1992 | Shibuya | 395/375 |
| 5,175,827 | 12/1992 | Morisada | 395/375 |
| 5,237,666 | 8/1993 | Suzuki et al. | 395/375 |

Primary Examiner—Kevin J. Teska
Assistant Examiner—Ayni Mohamed
Attorney, Agent, or Firm—Ronald L. Drumheller

[57] ABSTRACT

An improved history table is disclosed in which at least some of the entries are stored and accessed based upon the address of an instruction which historically preceeds the branch instruction itself. The access address may be used to determine the location of the entry in the table and/or may be stored in whole or in part in the entry itself. Furthermore, the improved history table may be of any known type including but not limited to branch history table types and decode history table types. The entries in the improved history table preferably are stored and accessed by the address of the preceeding taken branch target and preferably contain a number indicative of the number of instructions between the access address and the address of the branch instruction or its target.

8 Claims, 9 Drawing Sheets

FIG. 4

| MATCH FIELD | HISTORY | OTHERS |
|---|---|---|
| SSA1 | SSA2 | |

FIG. 6

| MATCH FIELD | HISTORY | | OTHERS |
|---|---|---|---|
| SSA1 | LENGTH1 | SSA2 | |

FIG. 7

| MATCH FIELD | HISTORY | | OTHERS |
|---|---|---|---|
| SSA1 | ENDA1 | SSA2 | |

FIG. 8

| MATCH FIELD | HISTORY | | OTHERS |
|---|---|---|---|
| SSA1 | LENGTH2 | SSA2 | |

FIG. 9

| MATCH FIELD | HISTORY | | OTHERS |
|---|---|---|---|
| SSA1 | ENDA2 | SSA2 | |

FIG. 10

| MATCH FIELD | HISTORY | OTHERS |
|---|---|---|
| BR_ADDR | BR_OUTCOME | |

FIG. 16

| MATCH FIELD | HISTORY1 | | HISTORY2 | | OTHERS |
|---|---|---|---|---|---|
| SSA1 | LENGTH2 | SSA2 | LENGTH3 | SSA3 | |

FIG. 17

| MATCH FIELD | HISTORY1 | | HISTORY2 | | OTHERS |
|---|---|---|---|---|---|
| SSA1 | ENDA2 | SSA2 | ENDA3 | SSA3 | |

HISTORY BASED BRANCH PREDICTION ACCESSED VIA A HISTORY BASED EARLIER INSTRUCTION ADDRESS

This is a continuation of application Ser. No. 07/860,631, filed Mar. 30, 1992, now abandoned.

FIELD OF THE INVENTION

This invention generally relates to control of instruction flow in a computer system and more particularly to the prediction of outcome of branch instructions using a history based branch prediction table.

BACKGROUND OF THE INVENTION

In typical pipelined processors, the processing of each instruction is divided into successive stages, with each stage of an instruction processing being handled by a specialized unit in a single cycle. Each successively earlier stage in the pipeline of stages is ideally handling simultaneously the successively next instruction. However, when a conditional branch instruction is encountered, there are several cycles of delay between the decoding of the branch instruction and its final execution/resolution, so it is not immediately known which instruction will be the next successive instruction. It is wasteful of the computer resource, however, to wait for the resolution of an instruction before starting with the processing of a next instruction. Therefore, it is recognized that it is advantageous to provide a mechanism for predicting the outcome of a conditional branch instruction in advance of its actual execution in order to provisionally begin processing instructions which will need to be processed if the prediction is correct. When the prediction is correct, the computer system can function without a delay in processing time. There is a time penalty only when a correct prediction cannot be attained ahead of time.

Throughout this application, the following terms and conventions will be used and shall have the indicated meaning. A branch instruction tests a condition specified by the instruction. If the condition is true, then the branch is taken, that is, following instruction execution begins at the target address specified by the branch instruction. If the condition is false, the branch is not taken and instruction execution continues with the instruction sequentially following the branch instruction. There may be branches that are unconditionally taken all the time. Such unconditional branches may simply be viewed as a special form of branches when appropriate.

A number of patents are directed to branch prediction mechanisms. For example, U.S. Pat. No. 4,370,711 to Smith discloses a branch predictor for predicting in advance the result of a conditional branch instruction in a computer system. The principle upon which the system is based is that a conditional branch instruction is likely to be decided in the same way as the instruction's most recent executions.

A simple strategy for handling branches is to suspend pipeline overlap until the branch is fully completed (i.e., resolved as taken or not taken). If taken, the target instruction is fetched from the memory. U.S. Pat. No. 3,325,785 to Stephens sets forth a static branch prediction mechanism. An improved method of this type is to perform static branch prediction by making a fixed choice based on the type of branch and statistical experience as to whether the branch will be taken. When the choice indicates that the branch is predicted to be not taken, normal overlap processing is continued on a conditional basis pending the actual branch outcome. If the choice proves wrong the conditionally initiated instructions are abandoned and the target instruction is fetched. The cycles devoted to the conditional instructions are then lost as well as the cycles to fetch the correct target instruction. However, the latter is often avoided in the prior art by prefetching the target at the time the branch is decoded.

A more sophisticated strategy is embodied in U.S. Pat. No. 3,559,183 to Sussenguth, which patent is assigned to the assignee of the present invention. It is based on the observation that the outcome of most branches, considered individually, tends to repeat. In this strategy, a history table of taken branches is constructed, which is known as a Branch History Table (BHT). Each entry in the table consists of the address of a taken branch followed by the target address of the branch. The table is a hardware construct and so it has a predetermined size. When the table is full, making a new entry requires displacing an older entry. This can be accomplished by a Least-Recently-Used (LRU) policy as in caches. When a branch is resolved as taken during execution, the history information associated with the branch is inserted into or updated in the BHT. Branch prediction and instruction prefetching are accomplished through constant search for the next taken branches in the history table. Upon final resolution/execution of a branch, any incorrect history information associated with the branch will be reset/updated properly. The major benefit of a BHT is to allow a separate branch processing unit to prefetch instructions into the instruction buffer (I-Buffer) ahead of the instruction decode stage. Such instruction prefetching into the I-buffer past predicted taken branches is possible due to the recording of target addresses for taken branches in the BHT. U.S. Pat. No. 4,679,141 to Pomerene et al, which patent is assigned to the assignee of the present invention, improves the BHT design by recording more history information in a hierarchical manner.

U.S. Pat. No. 4,477,872 to Losq et al, which patent is assigned to the assignee of the present invention, proposes a decode time branch prediction mechanism called a Decode History Table (DHT). The DHT mechanism improves the decode time static branch prediction methods of U.S. Pat. No. 3,325,785, to Stephens, by employing a hardware table to record simple histories of conditional branches. In the simplest form a DHT consists of a bit vector of fixed length. For each conditional branch instruction executed, a bit position in the DHT is derived through a fixed hashing algorithm, and the corresponding bit in the DHT records the outcome of the execution, indicating whether the branch was taken or not taken. Similar to U.S. Pat. No. 3,325,785, the DHT method allows overlap processing on a conditional basis past the decode of a conditional branch instruction if the branch is predicted, based on the DHT history, as not taken.

The common technique for the above cited branch prediction methods that are based on the dynamic histories of branches is to first record the previous outcome of branch instructions in a history based dynamic table and to then use such recorded histories for predicting the outcome of subsequently encountered branch instructions. Each branch recorded in such a history based table is recorded with either implicit or explicit information about the address of the recorded branch instruction so that the addresses of later encountered instructions can be correlated against the recorded information (i.e., by using the address of the instruction which is potentially a taken branch instruction in order to access the table for historical branch information). In order for branches to be predicted, the history table is checked for a relevant entry by correlating the address of the instruction to be predicted against the implicitly or explicitly recorded address information of recorded branch instructions. In the DHT method, the bit position in the history vector is derived through hashing from the address of the conditional branch. In the BHT approach, an instruction is predicted to be a conditional branch which is taken if there is a match of the instruction address with a taken branch address found in an entry in the BHT and the target address recorded in this found entry is predicted as the current branch target address.

Numerous variations and improvements have been proposed in implementing a BHT. For example, in U.S. Pat. No. 4,679,141 to Pomerene et al, a technique is described for recording histories by block (e.g., doubleword) addresses instead of by individual branch instruction addresses. This technique offers advantages in reducing cache fetch traffic and the possibility of identifying the outcome of multiple branches within a single block. However, through more complex tags at each BHT entry, the block recording technique still conceptually operates as in conventional BHT methods in terms of identifying taken branch history by matching the addresses of the currently concerned instructions against the recorded addresses (or more precisely matching a portion of each such address) of the branch instructions recorded in the block.

U.S. Pat. No. 3,940,741 to Horikoshi et al sets forth an information processing device for processing instructions, including branches. A cache-like route memory is provided for storing branch target addresses of a plurality of taken branch instructions and the branch target instructions (code) themselves in corresponding relationship to the branch target addresses. The route memory is referenced by the target address of a branch instruction, and the branch target instruction at the corresponding branch target address is read out. The Horikoshi et al patent utilizes the target address of the branch, which is known upon decoding of the branch, to retrieve target instruction code for decode if the target address is recorded as a previous target for a taken branch in the route memory. Such a mechanism generally requires some delay before the access to the route memory due to the address formation for the branch target.

In practical implementations for branch prediction based on histories, timing is often found to be a critical factor. History table access generally involves address calculations and slower array lookup operations. In order to efficiently search constantly for potentially taken branches in BHT type implementations also involves complexity in the recording of history entries. Considering all of the tasks which need to be accomplished in order to make a prediction and to utilize it to advantage, it is desirable for practical reasons to be able to start the prediction process with respect to a particular instruction of interest as far in advance as possible and also to achieve the prediction as far in advance as possible. Nevertheless, there is no known art that offers the capability of either making a prediction decision or even initiating the prediction decision process with respect to an instruction which is potentially a taken branch instruction prior to identifying the address of that instruction of interest. It would be desirable to be able to predict instruction branches even earlier than the point where the address of an instruction is know which has the potential of being a taken branch instruction, because it would offer an opportunity to implement and use branch prediction with simpler and less costly circuits.

SUMMARY OF THE INVENTION

It is therefore an object of the present invention to provide an alternative approach to the prediction of branch outcome based on histories in order to achieve an earlier prediction.

It is also an object to initiate the process of predicting the outcome of an instruction which is potentially a taken branch instruction prior to the time when the address of that instruction is known.

A further object is to predict a taken branch without first determining the address of the branch instruction.

It is another object to provide a history based branch prediction table which can be maintained and accessed using an instruction address which historically preceeds the branch instruction.

Another object is to record in a history based branch prediction table a number indicative of the number of instructions by which such a preceeding instruction historically preceeds the recorded branch instruction.

It is a further object to record the address of such a preceeding instruction in a history based branch prediction table.

These and further objects have been achieved by this invention with an improved history table in which at least some of the entries are stored and accessed based upon the address of an instruction which historically preceeds the branch instruction itself. The access address may be used to determine the location of the entry in the table and/or may be stored in whole or in part in the entry itself. Furthermore, the improved history table may be of any known type including but not limited to branch history table types and decode history table types. The entries in the improved history table preferably are stored and accessed by the address of the preceeding taken branch target and preferably contain a number indicative of the number of instructions between the access address and the address of the branch instruction or its target.

Theory of Operation

Instructions are executed in a computer according to a certain logical sequence. Each instruction resides in the memory at a specific address. Two successive instructions in the memory may be executed in sequential or non-sequential ordering. When two instructions are sequentially adjacent to each other the address of the second instruction is exactly the address of the first instruction incremented by the length of the first instruction code. Non-sequential flow of instructions may occur during execution by various causes, among which branch instruction executions are the most frequent. Instructions in a typical computer system may be classified into two categories: breaker and non-breaker. A non-breaker instruction is the type that will cause the sequentially following instruction to be executed next, unless an exception condition (e.g., divide-by-zero) occurs. A breaker instruction is the type that can cause natural jumps to a non-sequentially related instruction to be executed next. Taken branch instructions are typical breaker type instructions. For the simplicity of description of the basic concept of the present invention only branch instructions will be considered for breakers.

Without an exception condition, the instruction stream executed is a sequence of sequential blocks (S-blocks), with each sequential block consisting of zero or more non-breakers followed by a branch instruction at the end. The branch instruction of an S-block may be taken or not taken during execution. Similarly, the instruction stream executed is a sequence of sequential, segments (S-segments), with each sequential segment consisting of one or more successive S-blocks such that only the last S-block has a taken branch at the end. FIG. 1 depicts such a pattern of instruction flow during program execution. Only two S-segments (SS1 and SS2) are illustrated. SS1 consists of two S-blocks, SB11 and SB12. The branch instruction B11 at the end of SB11 is not taken, while the branch instruction B12 of SB12 is taken with the beginning of SS2 as the branch target. Similarly SS2 consists of three successive S-blocks SB21, SB22 and SB23. The ending branches B21 and B22 for SB21 and SB22, respectively, are not taken. The ending branch B23 of SB23 is taken with the beginning of another S-segment as the target.

Considering any conventional history based branch prediction method, the instruction stream is constantly examined for the next branch to be predicted. Upon locating such a branch instruction the branch predictor uses the branch address (in whatever representation) to look for an applicable history in the history table. For example, when conventional BHT design is applied to the S-segment S11 in FIG. 1, the S-segment S11 is scanned through for a taken branch in the history table. If B12 is the taken branch in the history table the S-segment S11 can be rather long and involves multiple cycles for the scan, even when block recording technique is used. Only upon locating the taken branch B12 in the history table prediction can then be carried out. Such conventional approach often leads to complex encoding of the history table in order to locate the relevant taken branches in a timely manner.

The present invention is based on the observation that the main purpose of conventional branch prediction methods is to resolve the flow of the instruction stream early in order to bring instructions into the instruction buffer soon enough for decoding. Branch addresses have been used for history table look-up for the natural reason that branches are normally the cause of non-sequential instruction flow. I have observed that predicting the outcome of a taken branch can be done without first locating the branch. For example, it is possible to create all S-segment history table (SSHT) to record the flow patterns among successive S-segments. With an SSHT, the instruction flow prediction can be achieved without locating and predicting individual branches. This observation has been further generalized into the concept of predicting instruction flow (as dominated by taken branches) based on addresses of instructions prior to the concerned branches. Use of such a technique for early resolution of branch predictions not only allows more timely resolution of instruction flow control but also offers flexibility for simpler implementations.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 4 shows the format of history table entries for prediction based on S-segments;

FIG. 6 shows an alternative format of history table entries for S-segment flow prediction, with length information recorded for the first S-segment;

FIG. 7 shows an alternative format of history table entries for S-segment flow prediction, with end address recorded for the first S-segment;

FIG. 8 shows an alternative format of history table entries for S-segment flow prediction, with length information recorded for the second S-segment;

FIG. 9 shows an alternative format of history table entries for S-segment flow prediction, with end address recorded for the second S-segment;

FIG. 10 shows the format of history table entries for a conventional DHT type branch prediction mechanism;

FIG. 16 shows a generalization of the history table entry format shown in FIG. 8, with the successive flow between more than two S-segments recorded; and FIG. 17 shows a generalization of the history table entry format shown in FIG. 9, with the successive flow between more than two S-segments recorded.

DETAILED DESCRIPTION OF A PREFERRED EMBODIMENT OF THE INVENTION

Figure 1:
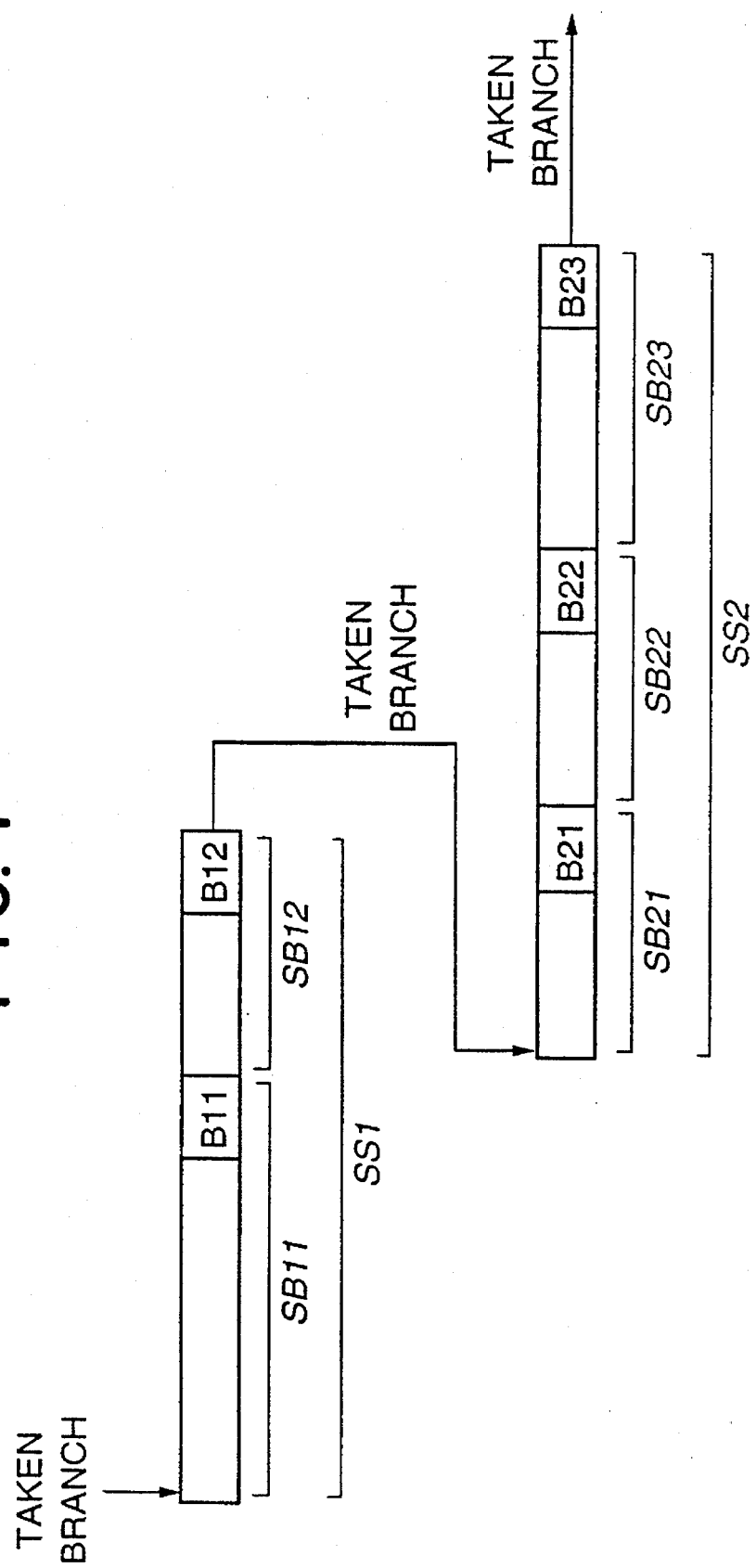
FIG. 1 is a block diagram showing the instruction flow patterns between successive sequential blocks and sequential segments.
Figure 2:
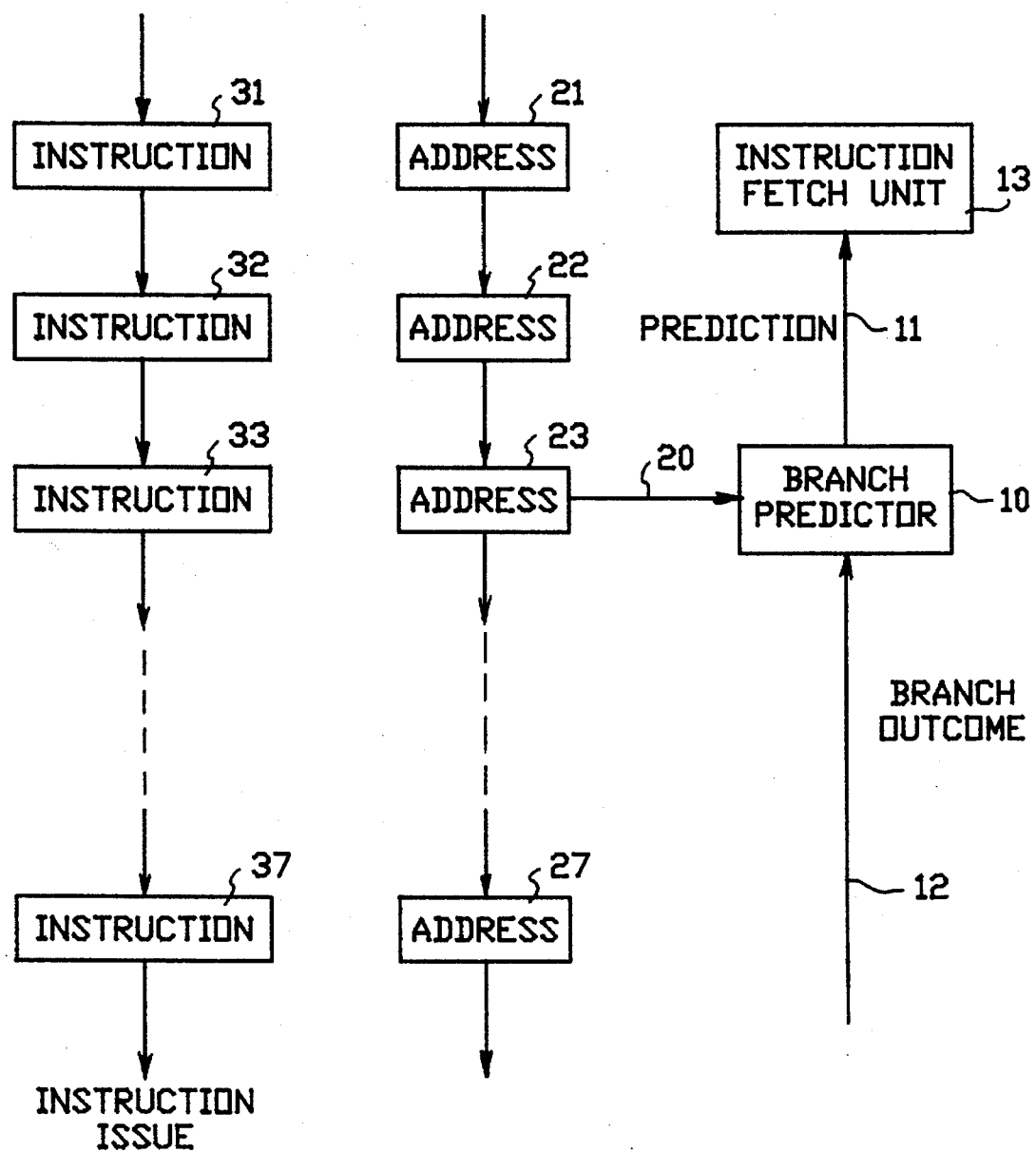
FIG. 2 is a block diagram showing the structure of pipelining with branch prediction.

Referring now to the drawings, and more particularly to FIG. 2, there is illustrated a typical computer pipeline structure with a branch prediction mechanism. The branch predictor 10 performs the branch prediction and branch history management operations. Instructions 31–37 are processed according to a certain logical sequence for a particular pipeline design. Addresses 21–27 represent the corresponding addresses of instruction stream 31–37. The branch predictor 10 receives an input instruction address on line 20 from address 23 in the instruction address pipeline. The prediction output 11 from the branch predictor 10 is normally used to determine the subsequent instructions to be fetched into instruction buffer. The branch predictor 10 also receives from input signal line 12 information that allows it to determine the correctness of prediction and the adjustment of history information. The issuing of an instruction 37 for actual processing (e.g., for decode or for a later step) is usually one or more cycles past the branch prediction stage in the pipeline.

The function of the branch predictor 10 is highly dependent upon the particular branch prediction design employed. For instance, with respect to the DHT mechanism employed in IBM 3090 systems, the branch predictor 10 is activated during the decode stage of an instruction in the pipeline with the output 11 being as simple as a single bit indicating the predicted outcome as taken or not taken for the instruction being decoded. In a more sophisticated BHT mechanism, the branch predictor 10 can be activated for an instruction several cycles earlier than the actual decode of the instruction with the prediction output 11 indicating whether the instruction is a taken branch or not and the target instruction address if the instruction is guessed as a taken branch. Although not a necessity, the output 11 of the branch predictor is normally passed to an instruction fetch unit 13 for prefetching the predicted subsequent instructions. The branch predictor 10 in prior art branch prediction schemes for early branch resolution conceptually guesses the outcome of a branch instruction 33 according to the branch address 23 input from line 20.

Figure 3:
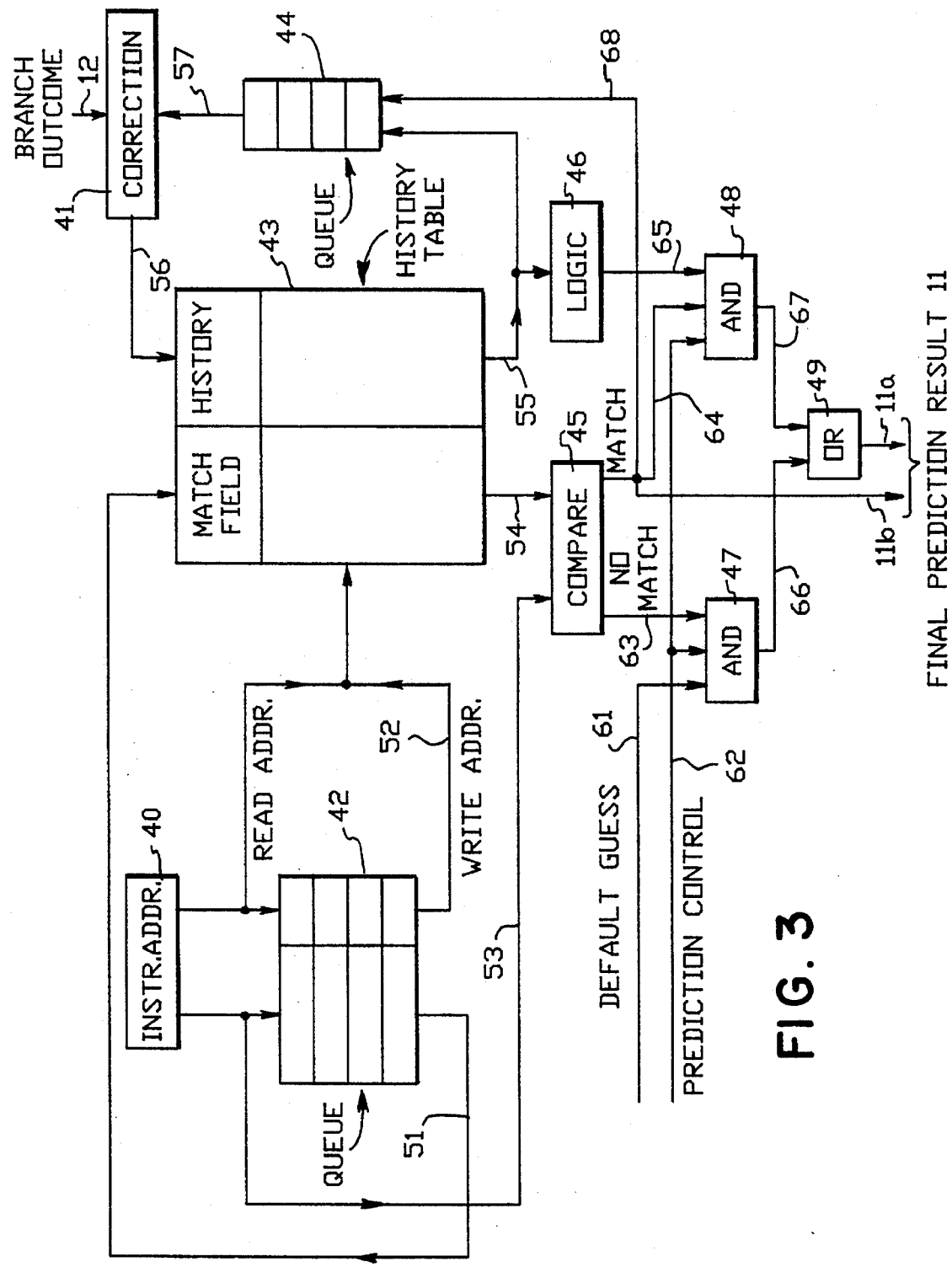
FIG. 3 is a block diagram showing the general structure of a history-based branch predictor.

Referring now to FIG. 3, which is a block diagram representation of the branch predictor 10 with a history table 43 utilized for branch prediction. An instruction address 40 from a register is the input instruction address for which prediction steps are to be taken. For simplicity of description of the invention, the history table 43 may be a 1-dimensional table with a fixed number of entries. The selection of an entry in the history table 43 for a given instruction address 40 is via proper hashing of certain address bits, Each entry in the history table 43 generally consists of two portions: MATCH FIELD and HISTORY. The MATCH FIELD portion is used for matching with input address bits in order to determine whether the history information recorded in the HISTORY portion of the entry is applicable. In the simplest case the MATCH FIELD portion can be null with the address match results considered always successful. The address queue 42 is used to hold address indicators for instructions with unfinished branch prediction status, The left portion of each entry of the address queue 42 contains address identifiers that are compatible with the MATCH FIELD in the history table 43. The right portion of each entry contains a tag allowing the identification of the entry selection for the associated instruction address. The address queue 42 is implemented as a first-in-first-out queue, The write address 52 signal is used for updating the history table 43. Upon update to the history table 43 the left portion of the oldest entry in the address queue 42 supplies the new value 51 for the MATCH FIELD. The result queue 44 is used for queuing predictions that have not yet been verified as correct, The compare logic 45 is used for determining a match between the MATCH FIELD value 54 of the selected entry of the history table 43 and the correspondence in the instruction address 40. The output HISTORY value 55 at the selected entry of the history table 43 is input to both the result queue 44 and logic 46. The logic 46 simply readjusts the HISTORY value received into a proper format. When a match is found at the compare logic 45, MATCH line 64 is raised (with value 1) and the AND logic 48 provides the prediction result to the OR logic 49 via line 67. If a match is not found at the compare logic 45, the NO MATCH line 63 is raised instead and causes a default guess result to be passed to the OR logic 49 via line 66. The output 11 from the branch predictor consists of two portions 11a and 11b. The output line 11a from the OR logic 49 gives the final result of the prediction based on the contents of the instruction address 40. The compare unit 45 provides the MATCH signal to the output line 11b. In certain implementations the output line 11b can be eliminated. For example, in the IBM 3090 implementation of a DHT, the MATCH FIELD is null and the MATCH signal 11b is conceptually on always and hence the compare unit 45 and the output line 11b can be ignored. The correction logic 41 takes as input the actual branch outcome 12 from the branch execution unit and via signal line 57 the earlier prediction from the first-in-first-out result from queue 44. By matching the branch prediction with the actual branch outcome the correction logic 41 performs the function of verifying correctness of active branch predictions and triggering necessary adjustments to the HISTORY portion of a relevant entry in the history table 43. The two queues 42 and 44 are controlled such that the history table 43 can be updated consistently with the corresponding prediction verified by the correction unit 41. In an implementation that allows only one access (Read or Write) per cycle to the history table 43, priority needs to be provided between concurrent accesses. For example, update to the history table 43 due to signal 56 from correction logic 41 may delay the read access for a new prediction. Such implementation choices are not critical to the present invention and will not be discussed in further detail. The MATCH signal from the compare unit 45 is also sent to the result queue 44 via signal line 68. It is assumed that each entry of the result queue 44 has a history hit bit (HH-bit) with the value (0 or 1) received from the signal line 68 upon prediction.

Upon history reset as triggered by signal 56 from the correction unit 41, all the subsequent instruction flow predictions may be regarded as abandoned. As a result, upon a history reset condition, both the address queue 42 and the result queue 44 will be emptied. Also as a direct consequence, prefetched instructions in the instruction buffer must be flushed as well.

In many implementations, the instruction address need not always trigger prediction through the history table Eliminating unnecessary prediction actions can reduce the size requirements for the address queue 42 and the result queue 44. Certain unspecified controls are assumed for controlling the activation and deactivation of the prediction mode.

The general concept of the present invention may be realized in various different ways. In order to illustrate this, various techniques will be described now with different types of designs utilizing different kinds of histories for prediction of instruction flow.

Instruction flow prediction will be described now using an S-Segment History Table (SSHT). In a conventional BHT approach, the MATCH FIELD portion of an entry in the history table 43 identifies the address of a previously taken branch and the HISTORY portion records the target instruction address to which the branch was taken. In the SSHT approach the history table 43 records the flow history of S-segment instead. FIG. 4 depicts the format of an entry in the history table 43 in which SSA1 and SSA2 represent the addresses of two S-segments such that a previous execution of the program previously flowed from the S-segment (SS1) beginning at SSA1 to the S-segment (SS2) beginning at SSA2 consecutively. Therefore, when the flow history entry depicted in FIG. 4 gets recorded in the history table 43, an execution flow to the first instruction of SS2 (at SSA2) directly from the last (branch) instruction of SS1 has just occurred.

Figure 5:
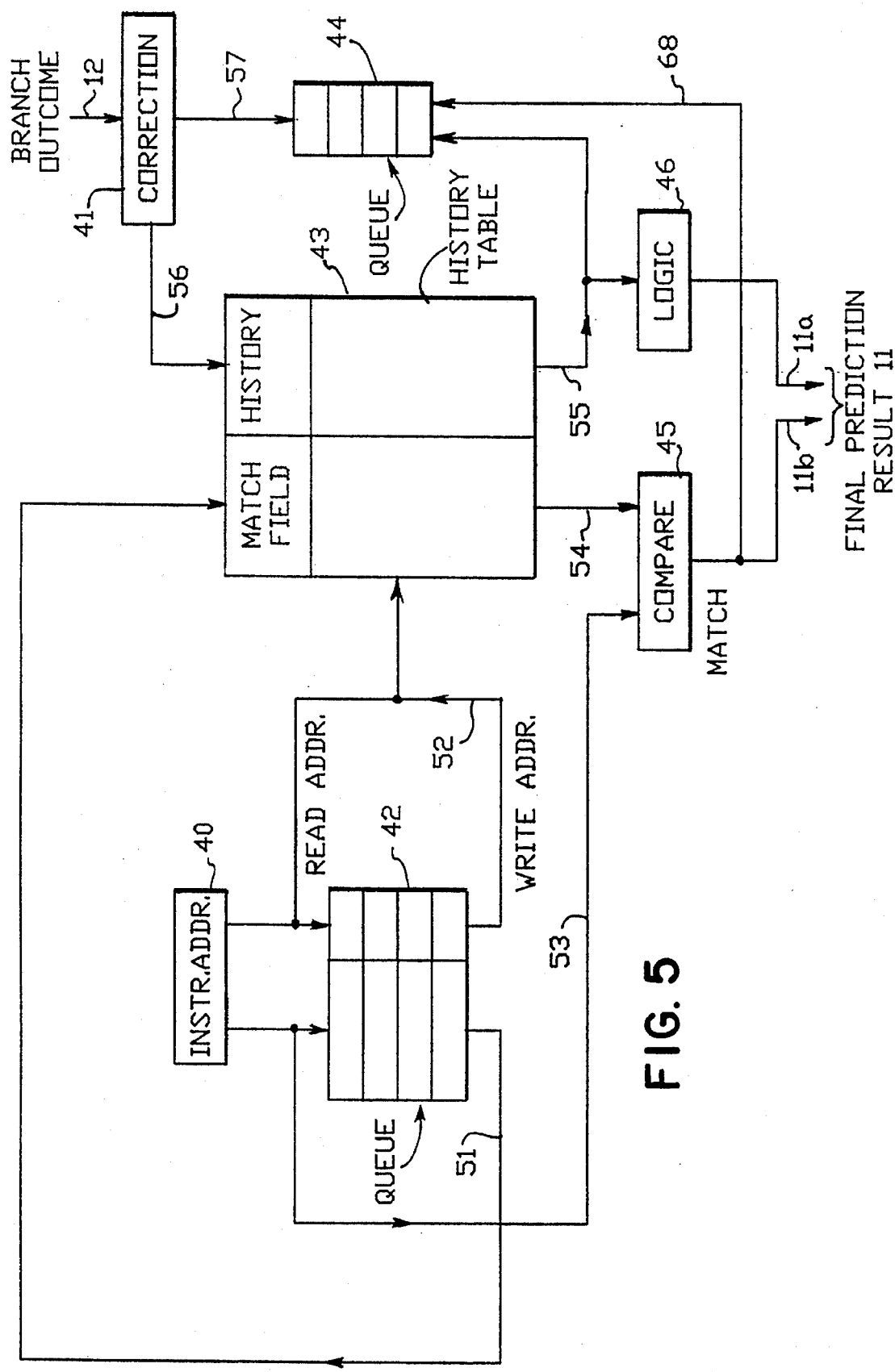
FIG. 5 is a block diagram showing a structure for the predictor of S-segment flow.

Referring now to FIG. 5, which shows a modified version of the block diagram of FIG. 3, for illustrating an SSHT implementation. The compare unit 45 simply outputs the MATCH signal 11b as part of the final prediction result 11. The default guess 61 in FIG. 3 is discarded. Assuming that the prediction mode is activated, there are two possibilities. When the MATCH line is raised (=1) in the output 11b of the predictor, an S-segment flow history is found with the instruction address 40 as the first S-segment and the address of the next S-segment indicated in the prediction output 11a.

On the other hand, when the MATCH line is low (=0) in the output line 11b, such an S-segment flow history is missing in the history table 43. In the SSHT implementation, the branch prediction for instruction address 40 can be activated only if the beginning of an S-segment is located, either through the S-segment chain as searched from the SSHT history table 43 or when a taken branch actually occurs during execution. When the S-segment chain through history pairs <SSA1,SSA2> of the history table 43 reaches a point where a next flow of S-segments is missing, there can be several different ways of proceeding. One simple approach to handling missing history in SSHT 43 is to hold the prediction activation until desired flow information is determined from a relevant taken branch. The correction logic 41 is invoked only when a breaker (e.g., taken branch) is found in execution. In principle, when the instruction to be executed at the moment is in an S-segment at beginning address SSA1, the oldest entry in the address queue 42 contains information for that S-segment and the oldest entry of the result queue 44 contains the corresponding earlier prediction result. The correction logic 41 is invoked when a breaker of the currently active S-segment is detected during execution, for which the correction logic 41 checks whether the oldest entry in the result queue 44 contains correct S-segment flow information. If at the oldest entry of the result queue the history-hit flag HH-bit is on (=1) and the target S-segment address matches the target for the currently executed breaker, the prediction is regarded as successful. Otherwise, either when the HH-bit is off (=0) or when the target S-segment address is wrong, the earlier prediction is regarded as unsuccessful. Upon detection of unsuccessful prediction, the correction logic 41 triggers history update operations by updating or inserting the relevant entry into the history table 43. The new history information gets the MATCH FIELD value from line 51 from the address queue 42 and the HISTORY value from line 56 from the correction unit S-segment prediction methods utilizing an SSHT have been described above. A major purpose for prediction of instruction flow is to facilitate prefetching of instructions into the instruction buffer. Still referring to FIG. 5, the output signals 11a and 11b are passed to a separate instruction prefetch unit. When the MATCH signal 11b is on (=1) the output 11a contains the address SSA2 of the S-segment which is predicted to follow the currently predicted S-segment at address SSA1. The instruction prefetch control still needs information on how long the S-segment at SSA1 is in order to determine when to start prefetching instructions for the S-segment at SSA2. There are various solutions for providing such length information to the instruction prefetch control. The most natural approach is to provide the information through the history table 43. An enhancement to the SSHT entry format shown in FIG. 4 is illustrated in FIG. 6, in which the HISTORY portion also contains a new tag LENGTH1. LENGTH1 describes the length of the S-segment at address SSA1. Upon a history-hit, as indicated by MATCH=1 in the output line 11b of FIG. 5, the output line 11a also provides the LENGTH1 information to the instruction prefetch control. With the LENGTH1 information the instruction prefetch control is able to determine how far sequential instructions for the S-segment at address SSA1 needs to be prefetched into the instruction buffer before the instruction prefetch for the S-segment at SSA2 should start. The result queue 44 in FIG. 5 also records the [LENGTH1, SSA2] prediction information. Upon locating a breaker during execution, the correction logic 41 calculates the actual length for the S-segment at SSA1 and determines whether the LENGTH1 prediction is correct. If not, proper instruction prefetch corrections need to be carried out in addition to the update of history information in the SSHT history table 41. There are various ways the instruction prefetch unit may handle history miss conditions (i.e., when the MATCH signal is off in output line 11b from the predictor). A straightforward approach is to carry out limited sequential instruction prefetching for the S-segment at address SSA1. For example, two consecutive doublewords may be prefetched into the instruction buffer for the current S-segment and the rest of instruction fetch might wait till more information becomes available. The history tag LENGTH1 may be represented in various ways as well, for which the most straightforward is to record the number of bytes. In many computer systems, instructions are all of equal length (e.g., a 4-byte word), in which case LENGTH1 only needs to record the number of instruction words involved. In IBM/390 architecture each instruction is of a length which is a multiple (1, 2 or 3) of 2-byte halfwords, for which LENGTH1 only needs to record the number of halfwords involved. In practice it is desirable to utilize few bits for LENGTH1 recording. From simulation studies it has been observed that a great majority of S-segments are rather short (e.g., ≦64 bytes). When the length of an S-segment is beyond the capacity of recording in the LENGTH1 tag, an overflow condition might be flagged at the LENGTH1 tag in the SSHT history table 43. Upon a LENGTH1 overflow the instruction prefetch control might simply treat the length of the corresponding S-segment as infinite, which will not be unreasonable in practice due to the rarity of long S-segments. Another possible alternative is to break up a long S-segment into multiple short partitions for recording as different entries in the SSHT history table A possible alternative to the recording of LENGTH1 information in FIG. 6 is to precisely identify the ending address of an S-segment instead. FIG. 7 describes such an alternative format for history table entry, in which an address tag ENDA1 is used for identifying the end of the S-segment beginning at address SSA1. The instruction prefetch control and the correction unit 41 might easily utilize the ENDA1 information for instruction prefetching and prediction verification.

In the above configuration, the LENGTH1 tag in FIG. 6 and the ENDA1 tag in FIG. 7 are both for identifying the first S-segment (beginning at address SSA1). It is also straightforward to modified the illustrated predictor constructs of FIG. 5 so that these tags are associated with the target S-segment instead. That is, the LENGTH1 tag could be replaced with a LENGTH2 tag that describes the length for the target S-segment beginning at address SSA2. Similarly, the ENDA1 tag may be replaced with a ENDA2 tag that describes the ending address of the target S-segment beginning at address SSA2.

In the above described SSHT prediction mechanisms, the instruction flow predictions are based on S-segment granularity. The principles can be generalized into other granule sizes, as long as the prediction operations can be carried out in a definitive manner with reasonable accuracies. For example the history of instruction flow can be constructed based on S-block granules instead. Prediction of S-block flow may be carried out in the manner similar to conventional BHT mechanisms. For example, it is not necessary to record sequential flow of S-blocks upon a miss of S-block flow in the history table. Sequential flow may be assumed and the next S-block may be looked for in the history table.

The above described SSHT prediction mechanism illustrates a way of realizing the concept of predicting instruction flow prior to identifying a branch address. Now another form of application of the concept will be described. In conventional history based branch prediction methods, the address of a branch is the basis for history look up. FIG. 10 describes a general format for history table entry for conventional methods. The MATCH FIELD contains BR_ADDR, which normally consists of a subset of the address bits of the branch, that is used for matching with the branch being predicted. The HISTORY portion contains the history BR_OUTCOME for the actual outcome of the branch upon a previous execution. In DHT type methods, the BR_OUTCOME can be as simple as a 1-bit tag indicating whether the associated conditional branch was taken or not taken.

Figure 11:
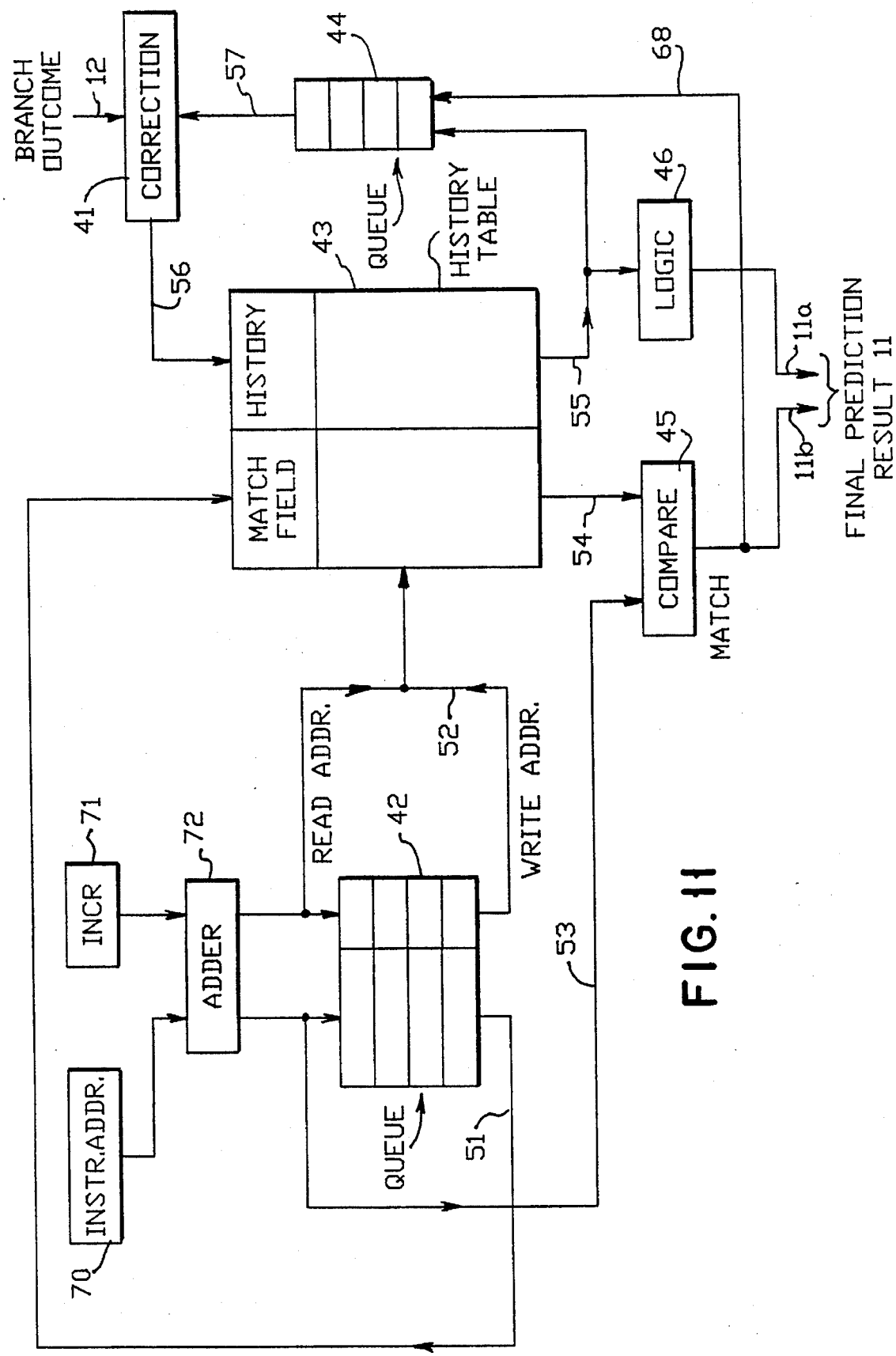
FIG. 11 is a block diagram showing a branch predictor in which an address adder is used to form the precise branch address.

Consider the branch predictor platform in FIG. 5. In many branch prediction methods, instruction addresses are constantly passed to the branch predictor. For example in the DHT approach, the decode of each instruction will trigger a possible branch prediction using the address of the currently decoded instruction as the instruction address 40 for the branch predictor. The prediction output 11a is considered active only when the MATCH signal is on (=1) in the output line 11b. An instruction can be reached (e.g., for decode) generally in two ways: a) falling through sequentially from the previous instruction; and b) being the target from another taken branch instruction. In most computer systems, a program counter is used for holding the address of a currently active instruction. The address of the sequentially next instruction can be derived by adding to the current program counter the length increment of the first instruction. FIG. 11 modifies the block diagram of FIG. 5 to reflect the process of deriving a new instruction address in some implementations. In FIG. 11 the instruction address 40 input of FIG. 5 is replaced with three components: an instruction address 70, a length increment register INCR 71, and an address adder ADDER 72. At the beginning of each cycle, ADDER 72 sums up the contents of INSTR.ADDR. 70 and INCR 71 to output the next instruction address for branch prediction. In certain more complex implementations more multiplexing operations might be involved in deriving the instruction address for branch prediction. The INCR 71 register content may either be 0 (e.g., for a taken branch target) or>0 (e.g., for a sequentially fall-through instruction).

Figure 12:
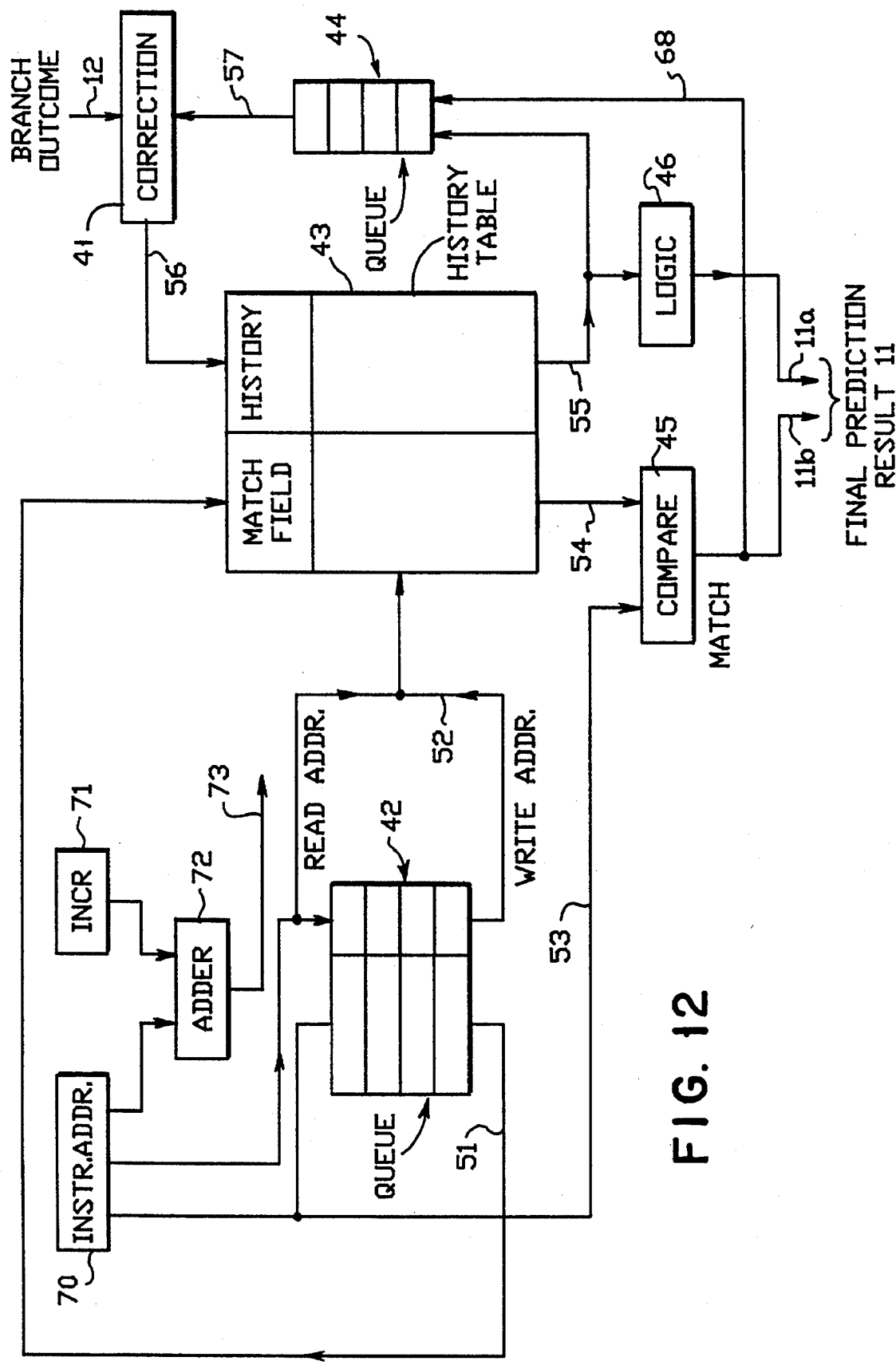
FIG. 12 is a block diagram showing an alternative design of the predictor shown in FIG. 11 which bypasses the address adder for history table access.

In high performance computer designs, ADDER 72 might introduce a heavy burden on the critical path timing for branch prediction, which involves array accessing for the history table. FIG. 12 is a modification of FIG. 11 for reducing the timing burden of branch prediction. ADDER 72 is still used for generating the new instruction address from INSTR.ADDR. 70 and INCR 71, since the address is generally needed for various operations other than branch prediction. The input to the branch predictor itself is, however, not from the output of ADDER 72. Instead the INSTR.ADDR. 70 itself supplies the input address for branch prediction. In this arrangement the prediction of branch outcome can be based on input address for an instruction that is sequentially preceding the actual instruction being predicted. The output 73 of ADDER 72 is passed to other units that require the precise address of the current instruction. This implementation clearly reduces the path timing of branch prediction by at least the amount needed for ADDER 72. The accuracy with this modification should be about the same as the one in FIG. 11 since it is highly repeatable how an instruction is reached during program execution. In this illustration it is not necessary to include length information in the entry for the history table 43, since the register INCR 71 itself already provides the increment information for the previous instruction.

Figure 13:
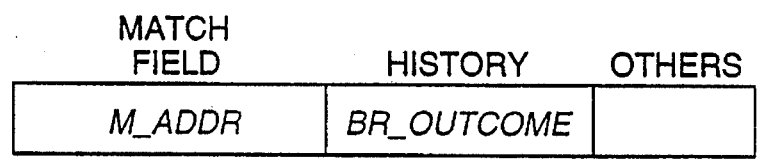
FIG. 13 shows an alternative to the history table entry format shown in FIG. 10 with a more general address at the MATCH FIELD.

FIG. 13 describes a modification to the format of the history table entry of FIG. 10. The MATCH FIELD now contains M_ADDR, which identifies a more general address that can be preceding the actual branch address under consideration.

Figure 14:
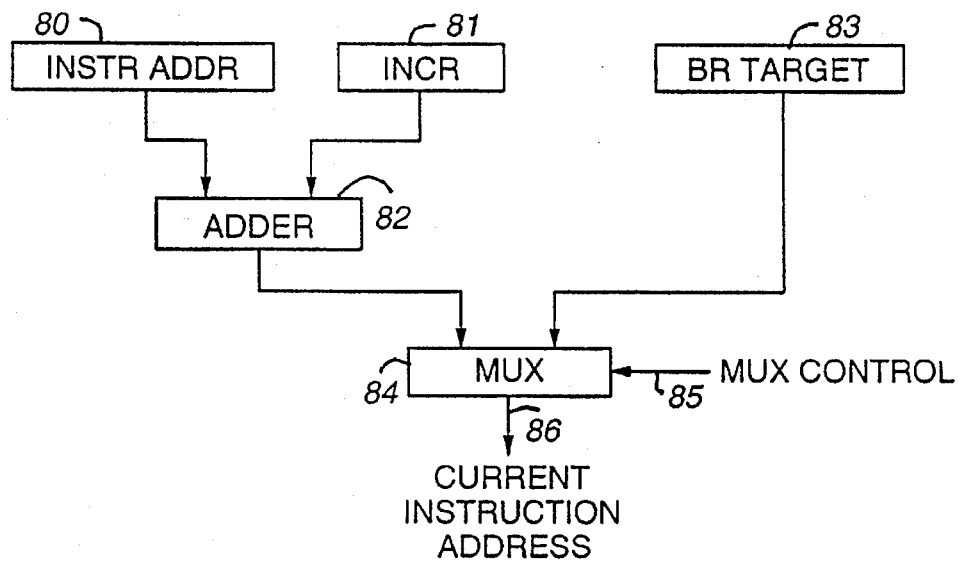
FIG. 14 shows an alternative method of address generation from the method illustrated in FIG. 11.
Figure 15:
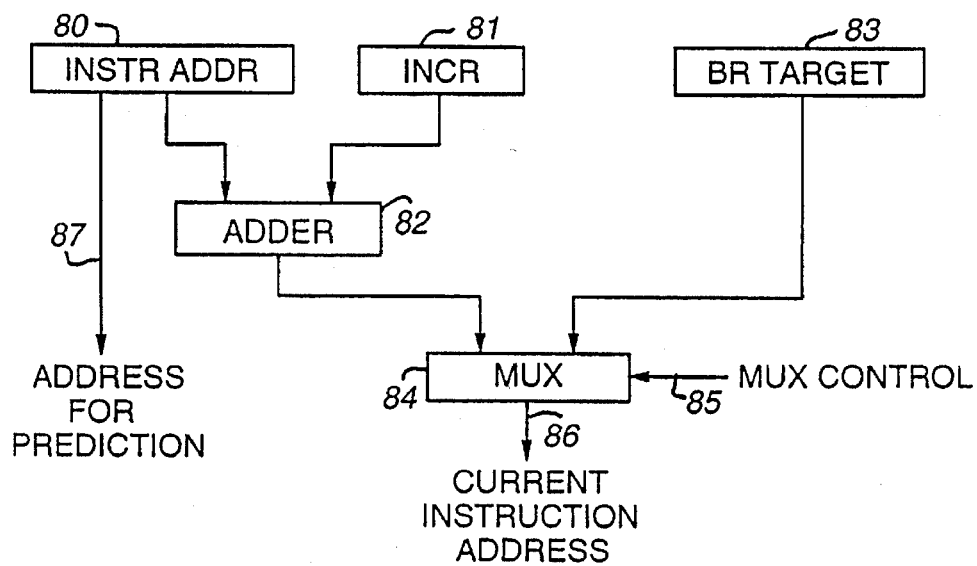
FIG. 15 illustrates the method of carrying out branch prediction always based on the address of the previous instruction processed.

In some implementations the portion of FIG. 11 for instruction address generation, including INSTR.ADDR. 70, INCR 71 and ADDER 72, can be carried out by an alternative method described in FIG. 14. In FIG. 14 an additional BR TARGET register 83 and a multiplexer MUX 84 are included. INSTR ADDR register 80 now always contains the address of the instruction last processed (e.g., decoded). BR TARGET 83 contains the address of target instruction if the last processed instruction is a taken branch. The multiplexer MUX 84 is used to select an address from BR TARGET 83 or from ADDER 82, depending upon whether the last instruction processed results in sequential flow. The MUX CONTROL 85 is a signal controlling the selection (e.g., from the instruction decoder). The output 86 from MUX 84 provides the final instruction address to be processed currently. When the last instruction processed is a taken branch (or any kind of execution that results in a non-sequential jump of instruction flow) BR TARGET register 83 will provide the current instruction address. When the instruction flow from the last processed instruction is sequential the address of current instruction is formed by ADDER 82 as illustrated before. FIG. 15 describes a modification to FIG. 14 for the purpose of early timing for branch prediction. As described for FIG. 12 the branch predictor 10 can use address not belong to the currently processed instruction. In FIG. 15 the INSTR ADDR register 80, which always contains the address of the last processed instruction, is passed for branch prediction via signal line 87. What should be noted is that in FIG. 15 the branch prediction can be acted upon the target of a taken branch based on the address of the taken branch itself.

The concept and techniques described in this preferred embodiment can be applied with different variations. For example, it is well-known that the matching of history entry through branch address can utilize only portion of the address bits. Hence, the MATCH FIELD portion of a history table entry described in this embodiment may cover only partial address bit information. More generally, the MATCH FIELD may cover information definitively derivable from relevant instruction status. For instance, the MATCH FIELD may contain a value hashed from an instruction address with other definitive execution status (e.g., the Segment Table Origin of IBM/390 architecture, which identifies the process address space of a particular program). The recording of length information of a S-segment may be in terms of the number of instructions or the number of branches covered by the S-segment, as long as certain pre-scanning mechanism is provided by the instruction fetch control to identify the relevant information through the prefetched instruction stream.

It is possible to enhance the history table with additional information when beneficial. For example, it is possible to include in the SSHT history table entry of FIG. 8 an additional field TARGET CODE, which stores the first instruction code at the target S-segment beginning at address SSA2. FIG. 16 and FIG. 17 contain extensions to the history information described in FIG. 6 and FIG. 7, with the flow patterns of three successive S-segments at each history table entry. Maintaining such explicitly the flow of more than two S-segments, however, requires much higher complexity in hardware design and should be exercised with caution.

While the invention has been described in terms of a preferred embodiment, those skilled in the art will recognize that the invention can be practiced with modification within the spirit and scope of the appended claims.

Having thus described my invention, what I claim as new and desire to secure by Letters Patent is as follows:

1. Apparatus for prefetching instructions for execution, comprising:

a history based branch prediction table for storing information about previously executed segments of sequentially addressed instructions, said segments terminating with a taken branch instruction;

said table storing for each of said segments a target address for said each segment, said target address being an address of a next executed instruction following said each segment when said each segment was previously executed;

said table also storing for said each segment, an address tag identifying a first instruction of said each segment and information to determine a length of said each segment, said length being variable from segment to segment;

means for holding in an instruction buffer a prefetched sequence of instructions for execution, said prefetched sequence including a last instruction having a last instruction address;

address comparing means for comparing said last instruction address to said address tags stored in said table in order to detect a matching address tag stored in said table; and prefetching means responsive to detection of a matching address tag in said table for prefetching storage said segment of instructions identified by said matching address tag, adding said prefetched segment to said prefetched sequence, and making said target address of said prefetched segment said last instruction address of said prefetched sequence.

2. Apparatus as defined in claim 1 wherein at least some of said address tags stored in said table correspond to a target address stored in said table.

3. Apparatus as defined in claim 2 wherein all of said address tags stored in said table correspond to a target address stored in said table.

4. Apparatus as defined in claim 1 wherein some of said segments terminating with a taken branch instruction include at least one additional branch instruction in addition to said terminating taken branch instruction.

5. Apparatus as defined in claim 4 wherein said additional branch instructions were not taken when said segments containing said additional branch instructions were previously executed.

6. Apparatus as defined in claim 1 wherein at least some of said segments have a size corresponding to at least three instructions.

7. Apparatus as defined in claim 1 wherein each said segment terminating with a taken branch instruction has for a stored target address a target address of said each taken branch instruction.

8. Apparatus as defined in claim 7 wherein all of said segments terminate with a taken branch instruction.

* * * * *